United States Patent
Nakano et al.

(10) Patent No.: US 10,650,225 B2
(45) Date of Patent: May 12, 2020

(54) IMAGE PROCESSING APPARATUS WHICH DETERMINES CATEGORY TO WHICH OBJECT IN IMAGE BELONGS, METHOD THEREFOR, AND OBJECT DISCRIMINATION APPARATUS

(71) Applicant: CANON KABUSHIKI KAISHA, Tokyo (JP)

(72) Inventors: Shunsuke Nakano, Kawasaki (JP); Yoshinori Ito, Tokyo (JP); Hiroshi Sato, Kawasaki (JP); Takahisa Yamamoto, Kawasaki (JP); Yuji Kaneda, Kawasaki (JP); Atsuo Nomoto, Tokyo (JP); Satoshi Yashiro, Yokohama (JP); Hideo Noro, Tokyo (JP); Kiyotaka Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 143 days.

(21) Appl. No.: 15/839,675

(22) Filed: Dec. 12, 2017

(65) Prior Publication Data
US 2018/0181795 A1 Jun. 28, 2018

(30) Foreign Application Priority Data
Dec. 27, 2016 (JP) ................................ 2016-253866

(51) Int. Cl.
*G06K 9/00* (2006.01)
*G06K 9/20* (2006.01)
(Continued)

(52) U.S. Cl.
CPC ..... *G06K 9/00255* (2013.01); *G06K 9/00228* (2013.01); *G06K 9/00268* (2013.01);
(Continued)

(58) Field of Classification Search
None
See application file for complete search history.

(56) References Cited

U.S. PATENT DOCUMENTS

| 5,725,480 A | * | 3/1998 | Oosta | A61B 5/0059 600/310 |
| 2007/0043527 A1 | * | 2/2007 | Quan | G06T 7/90 702/104 |

(Continued)

FOREIGN PATENT DOCUMENTS

JP 5018653 B2 9/2012

OTHER PUBLICATIONS

Zhang, Xiaozheng, et al. "Face Recognition across Pose: A Review," Pattern Recognition journal, Nov. 2009, pp. 2876-2896 (pp. 1-69), vol. 42—Issue 11, Elsevier Science Inc., New York, NY, USA.

(Continued)

*Primary Examiner* — Leon Viet Q Nguyen
(74) *Attorney, Agent, or Firm* — Canon U.S.A., Inc. IP Division

(57) ABSTRACT

An image processing apparatus includes an imaging unit, a determination unit, and a discrimination unit. The imaging unit images a target object using signals in a predetermined wavelength band in which a spectral transmittance of a specific substance of a plurality of substances on a surface of the target object is different from a spectral transmittance of the other substances of the plurality of substances. The determination unit determines a distribution state of the specific substance on the surface of the target object based on an image captured by the imaging unit. The discrimination unit discriminates a class to which the target object belongs based on the distribution state of the specific substance.

13 Claims, 8 Drawing Sheets

(51) Int. Cl.
*G06K 9/46* (2006.01)
*G06K 9/32* (2006.01)
*G06K 9/62* (2006.01)

(52) U.S. Cl.
CPC ......... *G06K 9/00288* (2013.01); *G06K 9/209* (2013.01); *G06K 9/2018* (2013.01); *G06K 9/3233* (2013.01); *G06K 9/4652* (2013.01); *G06K 9/6202* (2013.01); *G06K 2009/4666* (2013.01); *G06K 2209/21* (2013.01)

(56) References Cited

U.S. PATENT DOCUMENTS

| | | | | |
|---|---|---|---|---|
| 2015/0051498 | A1* | 2/2015 | Darty | A61B 5/447 600/477 |
| 2017/0213073 | A1* | 7/2017 | Lee | G06T 7/11 |
| 2018/0053044 | A1* | 2/2018 | Su | G06T 7/00 |

OTHER PUBLICATIONS

Ahonen, Timo, et al. "Face Recognition with Local Binary Patterns," Computer Vision—ECCV, 2004, pp. 469-481, vol. 3021, Lecture Notes in Computer Science, Springer, Berlin, Heidelberg, Germany.

Cootes, T. F., et al. "Active Shape Models—Their Training and Application," Computer Vision and Image Understanding, Jan. 1995, pp. 38-59, vol. 61—Issue 1.

Yin, Qi, et al. "An Associate-predict Model for Face Recognition," Proceedings of the 2011 IEEE Conference on Computer Vision and Pattern Recognition (CVPR), 2011, pp. 497-504. IEEE Computer Society Washington, DC, USA.

Wright, J., et al. "Robust Face Recognition via Sparse Representation," IEEE Transactions on Pattern Analysis and Machine Intelligence, Feb. 2009, pp. 210-227, vol. 31—Issue: 2.

Viola, P. et al. "Rapid Object Detection using a Boosted Cascade of Simple Features," Proceedings of the 2001 IEEE Computer Society Conference on Computer Vision and Pattern Recognition (CVPR), 2001.

Nielsen, Kristian P., et al. "The Optics of Human Skin: Aspects Important for Human Health," Solar Radiation and Human Health, 2008.

Fukui, Kazuhiro, et al. "Facial Feature Point Extraction Method Based on Combination of Shape Extraction and Pattern Matching," Systems and Computers in Japan, Jun. 15, 1998, pp. 49-58, vol. 29—Issue 6.

Igarashi, Takanor, et al. "Development of Cosmetics for Controlling Skin Appearances," Japanese Journal of Optics, Jul. 10, 2014, p. 318-324, vol. 43—Issue 7.

Taigman, Yaniv, et al. "DeepFace: Closing the Gap to Human-Level Performance in Face Verification," 2014 IEEE Conference on Computer Vision and Pattern Recognition, 2014.

\* cited by examiner

FIG. 4A
FIG. 4B
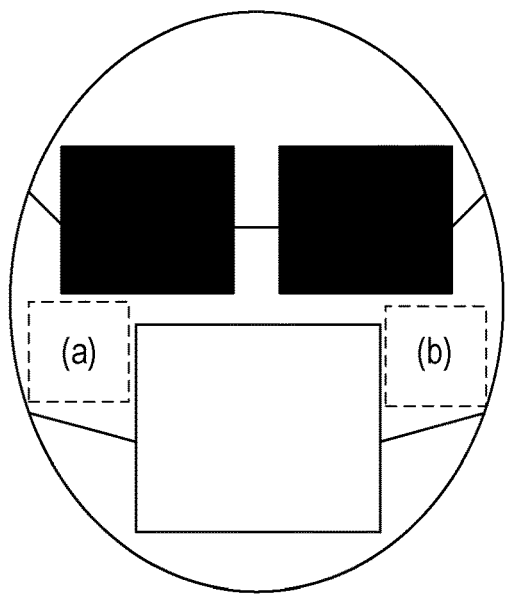
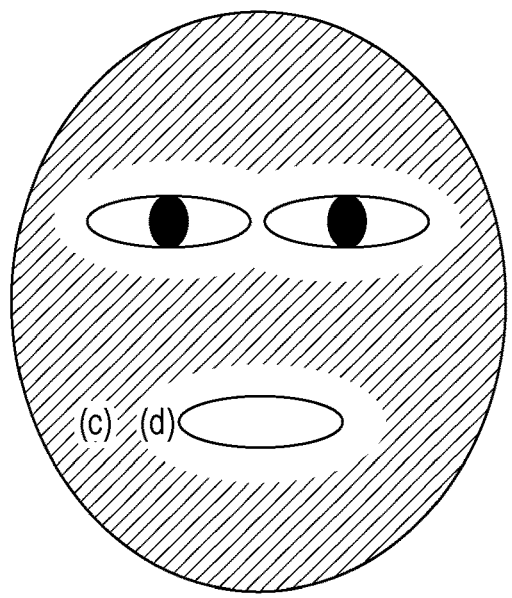
FIG. 5
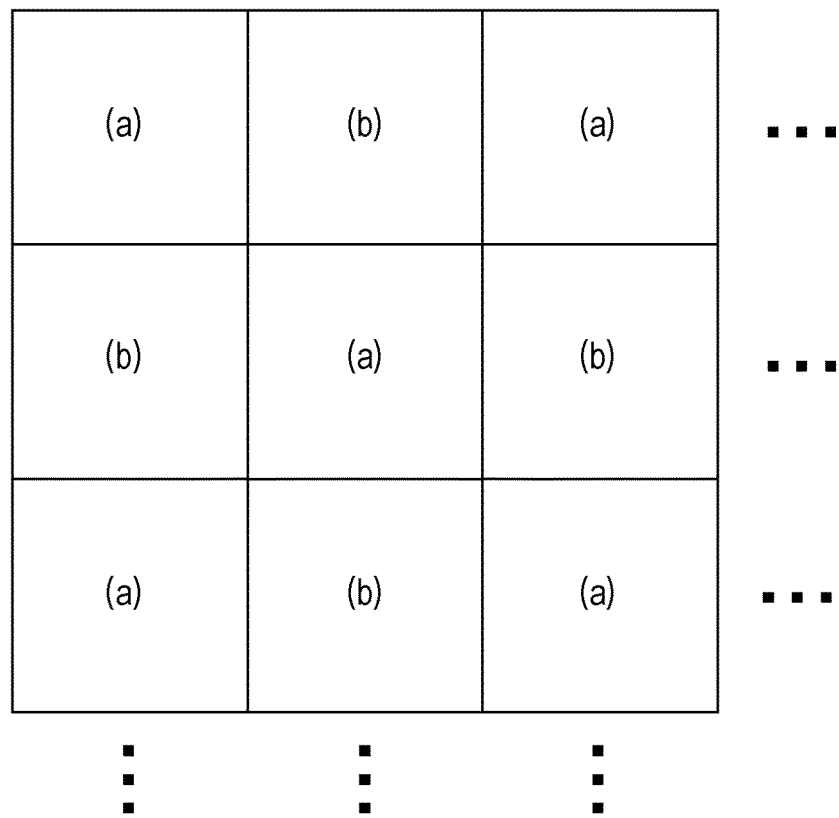

IMAGE PROCESSING APPARATUS WHICH DETERMINES CATEGORY TO WHICH OBJECT IN IMAGE BELONGS, METHOD THEREFOR, AND OBJECT DISCRIMINATION APPARATUS

BACKGROUND OF THE INVENTION

Field of the Invention

The present disclosure relates to a technique of determining a category to which an object belongs in an image including the object corresponding to captured image data.

Description of the Related Art

Various techniques of processing an image of an object corresponding to captured image data so as to extract effective information have been proposed. Examples of such a technique include a technique referred to as face recognition which recognizes an image of a human face and determining various information associated with the face. Examples of the face recognition include a technique of estimating a gender, an age, and a race and a technique of estimating facial expression. For example, as the gender estimation, templates of a face of a male and a face of a female are provided in advance, and a gender is determined by determining whether a face to be recognized is similar to the template of a male or the template of a female.

The examples of the face recognition further include a technique, referred to as face discrimination, of determining whether two face images indicate the same person. In the face discrimination, two face images are compared with each other so that a similarity degree indicating a value representing whether the two face images indicate the same person is obtained. When the similarity degree is equal to or larger than a predetermined threshold value, it is determined that the two face images indicate the same person. In the face discrimination, a person of an input face image may also be identified by comparing the input face image with different face images of different persons registered in advance, and in this case, the process is referred to as "face authentication". In the face authentication, an input face image is compared with each of face images of persons which have been registered, and a person corresponding to an obtained similarity degree which is equal to or larger than a threshold value and which is largest is determined.

Appearance of a face of the same person considerably varies depending on a direction of imaging or a direction of illumination. Such variation of appearance of a person is generally a large issue of face discrimination (refer to "Face Recognition Across Pose-Review", X. Zhang, Y. Gao, 2009). In the face discrimination, to address this issue, a method for extracting only a feature of appearance indicating an individual difference from a face image is widely used. (refer to "Face Recognition with Local Binary Patterns", T Ahonen, A Hadid, M Pietikainen, 2004). In this method, a feature value which is difficult to be affected by light and dark or lighting is obtained by comparing pixel values of pixels adjacent to each other in the face image. Here, the general method described above is employed on the assumption that an image of a face is captured by a general camera having a characteristic similar to vision of human beings. However, a method for imaging and analyzing a face in a specific wavelength band including a wavelength which is invisible for human beings has also been proposed. For example, in Japanese Patent No. 5018653, a face is imaged using near-infrared light, and a region of skin and a region of hair are separated from each other in a face region. Such separation is realized by utilizing a characteristic of a specific near-infrared light having a wavelength which is absorbed by skin and reflected by hair and an opposite characteristic of another near-infrared light.

When a person intends to identify a face, face organs including eyes, a nose, and a mouth are focused on as main portions of the face indicating an individual difference. Boundaries between face organs and skin have clear difference in color, and therefore, positions and shapes are easily detected. Furthermore, since different persons have different sizes and different shapes of organs, individual differences may be easily recognized. Therefore, a technique of detecting a position of a face organ in a face image has been actively studied (refer to "Active Shape Models—Their Training and Application", T. F. Cootes, C. C. Taylor, C. Cooper, and J. Graham, 1998, for example), and various methods for identifying a face actively using a face organ have been proposed. An example of the methods is disclosed in "An Associate Predict Model for Face Recognition", Q. Yin, X. Tang, C. Sun, 2011, for example.

Such a method utilizing a face organ has an issue in that identification of a face is difficult in a state in which a portion of a face organ is covered by a wearing object, such as a mask, glasses, or sunglasses. However, people generally wear a mask or sunglasses, and therefore, a method which also sufficiently achieves identification of a face wearing a wearing object is demanded. However, a skin region which is difficult to be covered and which is other than face organs is barely used for the face discrimination. This is because skin is imaged as a substantially uniform plane in general imaging apparatuses, and therefore, it is difficult to detect a position and a shape of a portion indicating an individual difference. As a technique of identifying a face in which organs are covered, appearance of an original face without wearing objects is estimated in "Robust Face Recognition via Sparse Representation", J. Wright et al., 2009. However, this method is experimentally performed in a case where imaging conditions, such as a direction of imaging on a face and luminance, are recognized, and therefore, it may be difficult to put such a method into practice.

SUMMARY OF THE INVENTION

According to an embodiment of the present invention, an image processing apparatus includes an imaging unit configured to image a target object using signals in a predetermined wavelength hand in which a spectral transmittance of a specific substance of a plurality of substances on a surface of the target object is different from a spectral transmittance of the other substances of the plurality of substances, a determination unit configured to determine a distribution state of the specific substance on the surface of the target object based on an image captured by the imaging unit, and a discrimination unit configured to discriminate a class to which the target object belongs based on the distribution state of the specific substance.

Further features of the present invention will become apparent from the following description of embodiments with reference to the attached drawings.

BRIEF DESCRIPTION OF THE DRAWINGS

FIGS. 4A and 4B are diagrams illustrating rectangle regions set in a face image according to the first embodiment.

FIG. 5 is a diagram illustrating sensor arrangement of an image input unit according to a second embodiment.

DESCRIPTION OF THE EMBODIMENTS

Hereinafter, embodiments will be described in detail with reference to the accompanying drawings.

First Embodiment

In a first embodiment, a human face is used as an object, and a case where the present disclosure is applied to face authentication for identifying a person of an input face is described as an example.

Entire Configuration

Figure 1:
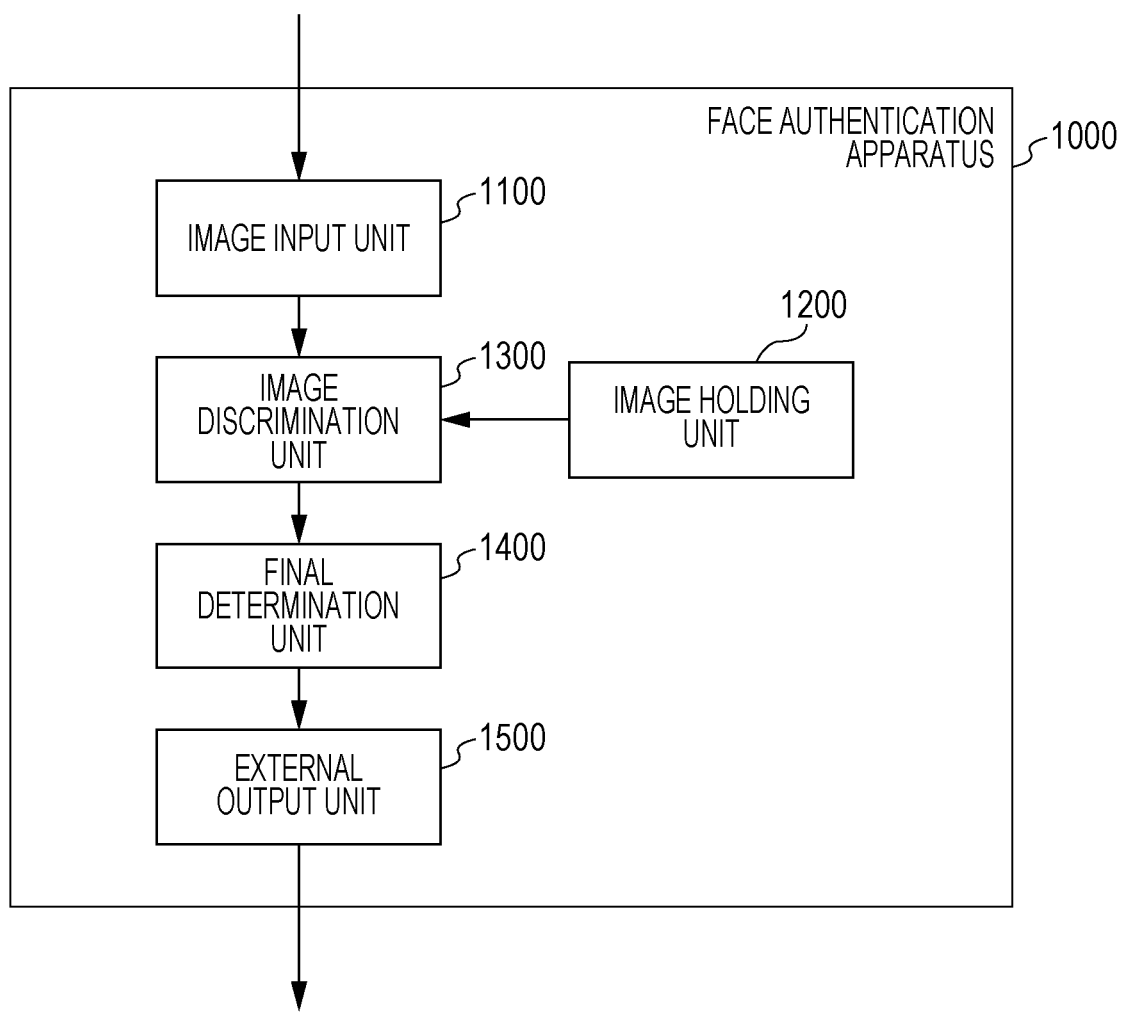
FIG. 1 is a functional block diagram illustrating a face authentication apparatus according to a first embodiment.

FIG. 1 is a block diagram illustrating a functional configuration of a face authentication apparatus 1000 according to the first embodiment. As illustrated in FIG. 1, the face authentication apparatus 1000 includes an image input unit 1100 which inputs an image to be processed, an image holding unit 1200 which holds face images of persons which have been registered, and an image discrimination unit 1300 which discriminates different face images. The face authentication apparatus 1000 further includes a final determination unit 1400 which finally determines a result to be output and an external output unit 1500 which outputs the result.

The image input unit 1100 is an imaging apparatus including an optical lens and an image sensor. The image input unit 1100 may be installed in a location physically separated from the other components and transfer images to the other components through a network. A configuration of the image input unit 1100 will be described in detail hereinafter. The image holding unit 1200 holds a face image of a person to be authenticated which is registered in advance. The image bolding unit 1200 is a large-capacity flash memory, for example, and preferably holds a plurality of face images. The image holding unit 1200 may hold data on a face image in a format of a feature value used for discrimination performed by the image discrimination unit 1300 instead of a face image. The image discrimination unit 1300 and the final determination unit 1400 identify a person of the input face image.

Configurations of the image discrimination unit. 1300 and the final determination unit 1400 will be described hereinafter in detail. The image discrimination unit 1300 and the final determination unit 1400 may be a dedicated circuit, such as an application specific integrated circuit (ASIC), or a processor, such as a reconfigurable processor, a digital signal processor (DSP), or a central processing unit (CPU). Alternatively, the image discrimination unit 1300 and the final determination unit 1400 may be programs to be executed inside a single dedicated circuit or a single general-purpose circuit (a CPU for a PC). Finally, the external output unit 1500 externally outputs an identified person corresponding to an output of the final determination unit 1400, that is, an identified person corresponding to a face image to be authenticated, in an appropriate form. The external output unit 1500 is typically a liquid crystal monitor, and displays the output of the final determination unit 1400 on image data in an overlapping manner after the image data obtained from the image input unit 1100 is displayed, for example. Furthermore, if a result of the determination of a person indicates a specific registered person, the result may be informed by sound from a speaker. These output units described above are merely examples, and a plurality of units may be simultaneously used.

Figure 2:
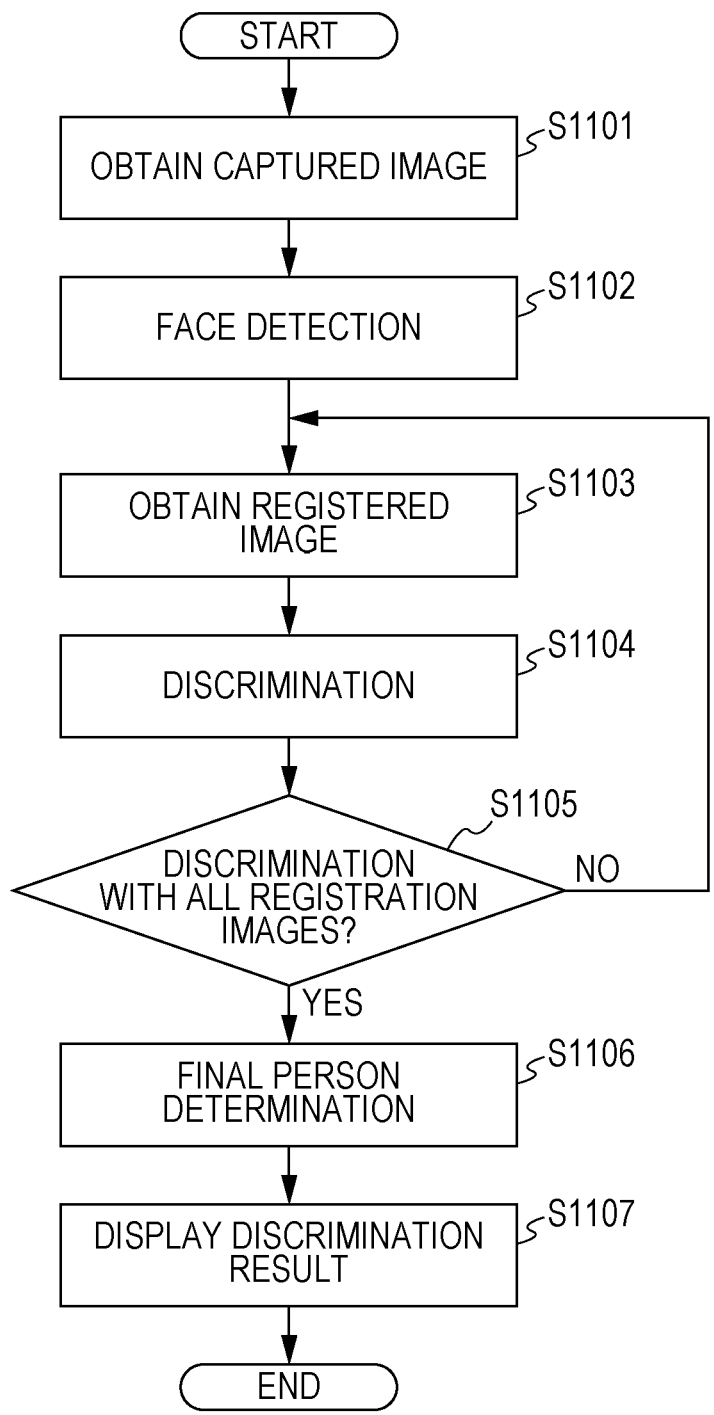
FIG. 2 is a flowchart of a processing procedure of entire face authentication according to the first embodiment.

FIG. 2 is a flowchart of a processing procedure of the entire face authentication according to this embodiment. An actual process of identifying a face image performed by the face authentication apparatus 1000 will be described with reference to FIG. 2. Note that it is assumed that only one face is included in an image obtained from the image input unit 1100 for simplicity of description in this embodiment. A plurality of faces may be included in a single image when the apparatus actually operate. In such a case, a process in step S1102 onwards in FIG. 2 is repeatedly performed for each face.

First, an image to be processed is obtained from the image input unit 1100 (S1101). Subsequently, a face of a person included in the image is detected (S1102), and thereafter, a position of the face in the image is obtained. Then one of the registered images is obtained from the image holding unit 1200 (S1103). The input image and the registered image are compared with each other (S1104) for discrimination. After the input image and all the registered images are compared with each other (S1105), a person in the input image is finally determined (S1106) and a result of the determination is displayed in the external output unit 1500 (S1107). The discrimination (S1104) and the person final determination (S1106) in FIG. 2 will be described in detail hereinafter. Note that general techniques may be used for the face detection in step S1102, such as a technique disclosed in. "Rapid Object Detection using a Boosted Cascade of Simple Features" P. Viola, M. Jones, 2001.

Image Input Unit

The image input unit 1100 in FIG. 1 will be described in detail. The image input unit 1100 is an imaging apparatus including an optical lens and an image sensor. A physical configuration of the sensor and a configuration of a developing process of forming an image by signals received as light by the sensor are described below taking a case where a face of a person is imaged as an example in this embodiment.

In general, a complementary metal-oxide semiconductor (CMOS) image sensor which is a representative of image sensors generally used in digital still cameras has color filters having different spectral transmittances on front surfaces of photodiodes. In general, three types of color filter, that is, R. G. and B, correspond to three colors, that is, red, green, and blue. All or some of the color filters are replaced by filters which support a certain wavelength band or filters of a full width at half maximum of 100 nanometer (nm) or less including a wavelength of 700 nm at a center, and preferably replaced by filters having spectral transmittances of approximately 50 nm.

In a developing process of actually obtaining an image from signals obtained by imaging performed by the image input unit 1100, the following operation is performed. In a case where the color filters of all pixels in the sensor are replaced by the filters described above, the camera may be used as a monochrome camera. If the sensor signals are extracted as they are and form an image, an image which is viewable in a wavelength band of a full width at half maximum of approximately 50 nm including a wavelength of 700 nm at a center may be obtained. On the other hand, in a case where a number of pixels in the sensor are replaced by the pixels described above, the pixels in the wavelength band described above are arranged in a pixel-skipped manner, and therefore, complementation (demosaic) is required for extracting an image representing appearance in the wavelength band.

An arbitrary method is employed in the complementation, and a convolution filter, such as a Gaussian filter, is used. When the Gaussian filter is employed in the obtained pixel-skipped image, an image in which values of skipped pixels are complemented may be obtained. Alternatively, when the number of pixels is small for each color and resolution is not effective, pixels having colors of similar spectral transmittances may be combined with each other so that the complementation is performed in a complementary manner. Furthermore, an edge component may be emphasized simultaneously with the complementation so that resolution is refined, for example. A difference between results of cases where two Gaussian filters having different characteristics are individually employed in the pixel-skipped image is obtained so that only an edge component is extracted. The edge component is added to the independently complemented image so that a desired image is obtained. This method is generally used as an unsharp mask filter.

In this embodiment, melanin existing in moles, pigmented spots, and pores on a face surface may be emphasized in an image when compared with vision of persons. This embodiment utilizes a characteristic in which, in a case where a plurality of types of substance have different spectral reflectances in a specific wavelength band, if the substances are viewed only in the specific wavelength band, differences among the substances are visualized due to differences of reflection luminances of the substances. The wavelength band in the vicinity of approximately 700 nm described above is the specific wavelength band in which a spectral reflectance of a melanin pigment is different from spectral reflectances of other skin regions (refer to "The Optics of Human Skin Aspects Important for Human Health, K. P. Nielsen, et al., 2008).

Not that, as supplemental, some indoor light sources, especially, some fluorescent lamps or some LED light are barely irradiated in a range of a wavelength of approximately 700 nm described in this embodiment. This apparatus receives light generated when a light source is reflected by a surface of an object, and therefore, no image may be obtained when such a light source is used. In this case, an auxiliary light source corresponding to the wavelength is used or a wavelength in imaging is selected.

As described above in this embodiment, in a case where only a number of the red, green, blue (RGB) color filters on the front surface of the image sensor are replaced by the color filters which support the wavelength of 700 nm, a normal RGB image may be also captured. Here, an R sensor corresponding to red receives light including a wavelength of 600 nm at a center. Light in the vicinity of the wavelength of 600 nm is included in many light sources and light properties thereof are similar to those of the wavelength of 700 nm in this embodiment, and therefore, the R sensor may become a substitute.

Note that, instead of the special sensor which supports a narrow wavelength band including the wavelength of 700 nm at a center described in this embodiment, a general RGB sensor which is widely used may similarly realize this embodiment in some degree. A center wavelength of the R sensor among general R, G, and B, is 620 nm which has optical properties comparatively similar to the wavelength of 700 nm described above, and therefore, similar imaging, is expected in addition to R, a general RGB image may be used. Features of a skin surface may be extracted in some degree even from the RGB image, and therefore, characteristics to be used for identifying a person may be extracted. However, among R, G, and B, it is not preferable that a sensor corresponding to G or B is independently used. This is because, wavelengths of G and B are shorter than that of R, rates of re-reflection is small due to absorption in skin, and rates of amounts of light reflected by the surface are relatively large, and therefore, the skin surface may be garish in a captured image depending on a position of a light source. Accordingly, G and B are not appropriately used for measuring features of the skin surface.

Discrimination Process: Outline

Figure 3:
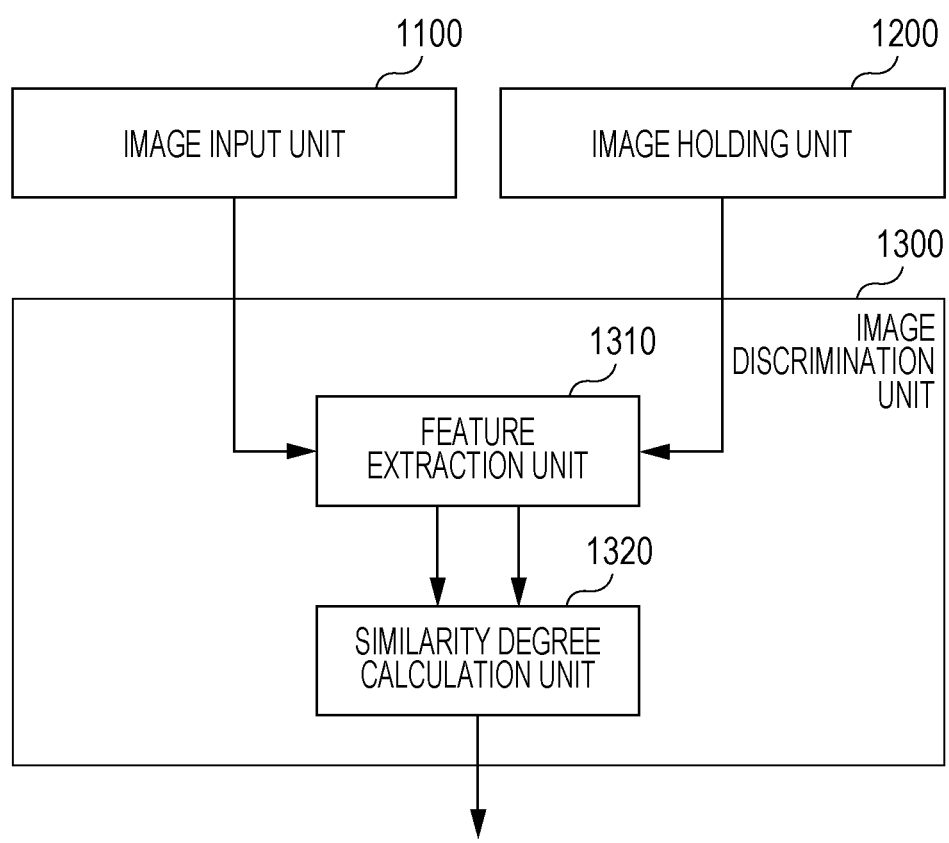
FIG. 3 is a functional block diagram illustrating a face discrimination unit according to the first embodiment.

Outline of the discrimination process (S1104) in FIG. 2 will be described. FIG. 3 is a block diagram illustrating a functional configuration of the image discrimination unit 1300. First, a feature extraction unit 1310 extracts a facial feature to be used for identifying a person from the obtained input image and the registered images. Subsequently, a similarity degree calculation unit 1320 compares feature values obtained from the two images with each other so as to calculate a similarity degree which is a value indicating whether two face images indicate the same person. These steps will be described in detail hereinafter. Note that it is assumed that the registered images held by the image holding unit 1200 are also captured by the image input unit 1100 similarly to the input image in this embodiment. Furthermore, the registered images may be held in a state of feature values converted by a feature extraction process described below.

Discrimination Process: Feature Extraction

The feature extraction unit 1310 in FIG. 3 will now be described. A feature value required for identifying a person is extracted from a face image. Although an arbitrary method may be employed, a feature value is extracted as follows in this embodiment. It is assumed in this embodiment that a face from which a feature value is to be extracted is covered by wearing objects including a mask and sunglasses, and therefore, eyes and a mouth are not viewed. Note that a method described below may be also employed in a case where eyes and a mouth in a face are viewed. Furthermore, examples of the wearing objects include a hat, an eyepatch, bandages, and an adhesive plaster.

First, a region including a face is detected in the input image by the method described in "Rapid Object Detection Using a Boosted Cascade of Simple Features", P. Viola, M. Jones, 2001 described above. A rate and a direction of a face relative to the detected region are adjusted to be substantially constant, and information on a size and upper and lower sides of the face region may be obtained. Thereafter, rectangle regions from which feature values are to be extracted are set in the face image in accordance with the relative positional relationship with the entire face. FIG. 4A is a diagram illustrating the rectangle regions set in the face image. Although sizes and positions of the regions are arbitrary set, specifically, regions (a) and (b) in FIG. 4A, for example, which correspond to cheeks which are not expected to be covered by the mask or the sunglasses are set.

Subsequently, feature values for identifying a person are extracted from the rectangle regions. The feature values are multidimensional values represented by feature vectors. Although an arbitrary extraction method may be employed, the following method is employed, for example. As a simplest method, pixel values in a rectangle region are sequentially extracted in a direction from upper left to lower right, and a numerical sequence obtained by connecting the pixel values in a line is set as a vector. Alternatively, before the pixel values are extracted, the method disclosed in "Face Recognition with Local Binary Patterns", T. Ahonen, A. Hadid, M. Pietikainen, 2004 may be used. When conversion into only the magnitude relationship between adjacent pixels is performed, variation of a luminance value in the entire image depending, on an imaging environment may be removed. Furthermore, other various image processing filters may be combined as preprocessing.

However, such a method for extracting pixel values in an arranged manner described above may be redundant since the entire skin region is a feature value. Although examples of the individual difference in a human face include eyes, a nose, and a mouse, in a state in which the individual difference is not viewed, a local pattern, such as a mole, a pigmented spot, a pore, a blood vessel, downy hair, or a scar, is an important clue.

Specifically, a size, density, and a position of a pattern in skin, and the number of patterns are important clues. For example, only information on the clues may be extracted by the method disclosed in "Facial Feature Point Extraction Method Based on Combination of Shape Extraction and Pattern Matching", K. Fukui, O. Yarnaguchi, 1998. This method indicates a filter operation for obtaining a position of a pattern having a specific size and a specific shape in an input image. Assuming that moles in a face have a substantially circle shape, a filter which detects circles of different sizes is provided so that positions of the moles having different sizes are obtained. Furthermore, certainty of existence corresponding to density of a mole is also obtained by this method. Accordingly, features for identifying a person may be extracted by determining a size, density, and a position of a mole in a cheek as feature values. Patterns of different shapes may be similarly extracted by arbitrarily changing a filter shape.

Here, an image captured in the wavelength of 700 nm described above emphasizes a skin feature. Therefore, in a case where face organs are viewed since wearing objects, such as a mask and sunglasses, are not worn, portions of the face organs may be imaged in another wavelength. As described above in this embodiment, in the case where a number of RGB color filters in the front surface of the image sensor are replaced by color filters which support the wavelength of 700 nm, a general RGB image may be captured. For example, as illustrated in FIG. 4B, a wavelength for imaging is changed depending on a face region. In FIG. 4B, a hatched region (C) indicates skin, and an image corresponding to the wavelength of 700 cm is obtained. General RGB images are obtained in other regions (d). The feature extraction described above is performed on the region (C), and features are extracted using the method disclosed in the related art in the regions (d) indicating the face organs. A method for determining whether the face organs are viewed is realized by applying a technique disclosed in "Rapid Object Detection Using a Boosted Cascade of Simple Features" P. Viola, M. Jones, 2001. Although the detector learns such that a face is detected in an image, for example, in this method, similarly, the detector may learn such that eyes are detected in a face, for example.

Discrimination Process: Similarity Degree Calculation

The similarity degree calculation unit 1320 in FIG. 3 will be described. Here, the feature value of the input image and the feature value of the registered image are compared with each other so that a similarity degree is calculated. Although an arbitrary method is employed, a method for representing a fact that the larger the similarity degree is, the more similar the feature values are, that is, representing the same person in the input image and the registered image is selected. Examples of the method include a method for obtaining cosine of an angle formed by the vectors of the feature values and a method for obtaining a reciprocal number of a Euclidian distance between the vectors of the feature values.

Person Final Determination

Here, the person final determination (S1106) of FIG. 2 performed by the final determination unit 1400 in FIG. 1 for finally determining a person included in the input image will be described in detail. It is assumed that similarity degrees between the registered images relative to the input image are individually obtained before this process is performed. Here, one of the registered persons corresponding to the person included in the input image is identified or a determination as to whether the person is one of the registered persons is made.

First, a largest one of obtained similarity degrees is obtained. Thereafter, it is determined whether the largest similarity degree is larger than a predetermined threshold value. As a result, when the determination is affirmative, it is determined that the person included in the input image is one of the registered persons corresponding to the largest similarity degree. On the other hand, when the determination is negative, it is determined that the person included in the input image is no one in the registered persons, that is, an unregistered person.

The threshold value is adjusted in advance. In the face authentication, unauthentication and misauthentication have the trade-off relationship, and a type of an error of authentication to be preferentially reduced may be selected by changing the threshold value. When the threshold value is low, the possibility that the same person is not appropriately determined, that is, the possibility of unauthentication, is reduced. However, the possibility that different persons are mistakenly determined as the same person, that is, the possibility of misauthentication, is increased. On the other hand, when the threshold value is high, although the possibility of misauthentication is reduced, the possibility of unauthentication is increased.

Points of this Embodiment

The configuration of this embodiment has been described hereinabove. Points of this embodiment will now be described. In this embodiment, identification of a face is to be realized even in a case where eyes, a nose, and a mouth which are major individual differences of the face are not viewed. In this embodiment, by using the imaging apparatus having a visual characteristic different from that of human beings, that is, by receiving light of a narrow wavelength band having a main width of 50 nm including a wavelength of 700 nm at a center, portions of skin in which melanin is concentrated are emphasized when compared with a state viewed by vision of human beings. Then patterns of the portions in which the melanin is concentrated are extracted and identified as individual differences from the skin including cheeks which are not covered by a mask or sunglasses.

There are two reasons for emphasized imaging of melanin of skin as below. As a first reason, which is disclosed in "The Optics of Human Skin Aspects Important for Human Health", K. P. Nielsen et al. 2008, when melanin content rates of portions in skin are different from one another, light reflectances in the wavelength band described above are also different from one another. As described above, in a case where different spectral reflectances are obtained for a plurality of types of substance in a specific wavelength band, if the substances are imaged only in the specific wavelength band, differences among reflection luminances of the substances are visualized. That is, portions having a large amount of melanin are imaged darker than those viewed by the vision of human beings whereas portions having a small amount of melanin are imaged brighter. The vision of human beings receives light in a wavelength band of a visible light (a range from approximately 400 nm to approximately 800 nm). Therefore, human beings perceive the skin in a state in which view in a wavelength band in which reflectance varies depending on the melanin contain rate of the skin and view in a wavelength band in which reflectance does not vary are added to each other.

Specifically, although repeatedly mentioned, in the method of this embodiment, contrast of brightness and darkness between portions in which the melanin are concentrated and the other portions may be emphasized in imaging when compared with a case where a general imaging apparatus having a characteristic similar to vision of human beings is employed.

As a second reason, the wavelength band for receiving light in this embodiment is on a long wavelength side in visible light, and light in the wavelength band is transmitted through a skin surface and is reflected inside the skin. Furthermore, in this embodiment, by receiving only light of a longer wavelength in the visible light which is shorter than that of the near-infrared light, the light is transmitted through unevenness of the skin surface represented by skin texture and only presence or absence of melanin in the skin may be imaged.

Second Embodiment

Although a specific narrow wavelength band is used as a wavelength band of the imaging apparatus which obtains an input image, the present disclosure is not limited to this. A case where an effect is enhanced by imaging a face using a plurality of wavelength bands will be described as an example. To avoid redundancy, descriptions of portions the same as the first embodiment are omitted. Functions of units which are not described in this embodiment are the same as those of the first embodiment, and therefore, descriptions thereof are omitted (refer to the first embodiment for the omitted units).

Image Input Unit

Differences between the image input unit 1100 in FIG. 1 of the first embodiment and that of the second embodiment will be described. In the first embodiment, the case where the color filters disposed on the front surface of the photodiode for all the pixels of the image sensor are replaced by the filters having single spectral transmittance is described. In this embodiment, two types of color filter are arranged. FIG. 5 is a diagram illustrating sensor arrangement of an image input unit according to this embodiment. Specifically, two types of color filters are arranged in a checkerboard pattern for pixels arranged in a matrix. One of the types of filter is a filter having a spectral transmittance of a wavelength band having a full width at half-maximum of approximately 50 nm including a wavelength of 600 nm at a center, and the other is a filter (b) having a spectral transmittance of a wavelength band having a fill-width at half-maximum of approximately 50 nm including a wavelength of 700 nm at a center which is similar to the first embodiment.

However, the arrangement in FIG. 5 is merely an example, and the present disclosure is not limited to this. The number of pixels corresponding to one of the color filters may be larger or smaller depending on an absolute magnitude of the spectral transmittance of the color filter. As supplemental, two types of wavelength band may not be simultaneously imaged by a single image sensor. A method for simultaneously imaging the wavelength bands by image sensors included in two imaging apparatuses which are installed physically close to each other may be employed. Alternatively, a method in which the color filters (a) and (b) in front of a single image sensor are set movable and replaceable and imaging is first performed using the color filter (a), and thereafter, imaging is performed using the color filter (b) may be employed.

The description of the configuration of the image input unit 1100 of the second embodiment is described hereinabove, and a procedure of obtainment of an input image will be described hereinafter. Hereinafter, the wavelength band of 600 nm is referred to as a wavelength band (a) and the wavelength band of 700 nm is referred to as a wavelength band (b) for simplicity. First, light beams of both the wavelength bands are received. If the pixels on the single image sensor support both the wavelength bands as illustrated in FIG. 5, the light beams may be simultaneously received. Thereafter, signals of the light beams received in the wavelength bands (a) and (b) are used to form an image. If an image is formed by simply extracting the sensor signals in the individual wavelength bands, no signals are output in positions having no pixels, that is, the image is in a pixel-skipped state of a checkerboard pattern. Therefore, values of skipped pixels are complemented (demosaic). Although an arbitrary method is employed in the complementation, and the method employed in the first embodiment is used. In this embodiment, an input image formed by two channels, that is, the wavelength bands (a) and (b), is obtained. As disclosed in "The Optics of Human Skin Aspects important for Human Health" K. P. Nielsen et al. 2008, spectral reflectance barely varies irrespective of an amount of melanin pigment of skin in the wavelength band of 600 nm used in this embodiment.

Discrimination Process: Feature Extraction

Differences between the feature extraction unit 1310 in FIG. 3 of the first embodiment and that of the second embodiment will be described. In this embodiment, after rectangle regions are set, gains in the channels of the wavelength bands (a) and (b) are controlled, and thereafter, a difference image obtained by subtraction between luminance values of the channels is obtained as a calculation result.

Figure 6:
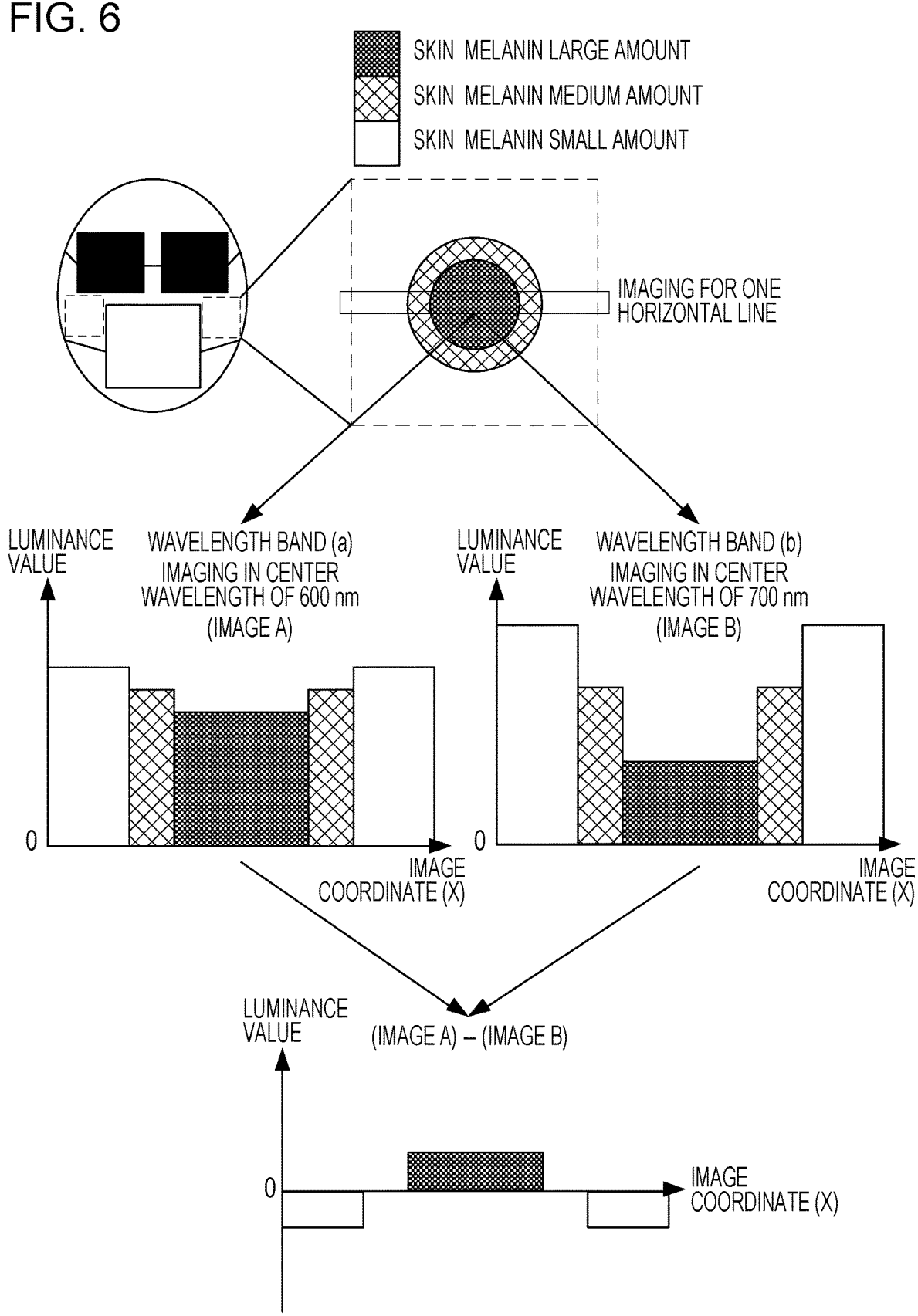
FIG. 6 is a diagram illustrating generation of a difference image according to the second embodiment.

First, the luminance values of the channels obtained in both the wavelength bands are multiplied by the gains so that a state illustrated in FIG. 6 is to be obtained. In the state illustrated in FIG. 6, magnitudes of sensor signal values, that is, the luminance values, obtained when skin is imaged in both the wavelength bands are substantially the same as each other. If a light source in an environment of this embodiment may be fixed, the gains may be obtained in advance. A luminance value Brightness of the skin in the channel corresponding to the wavelength band (a) may be obtained by "$A(a) \times B(a) \times C(a)$" described below. A luminance value Brightness corresponding to the wavelength band (b) is similarly obtained.

$$\text{Brightness}(a) = A(a) \times B(a) \times C(a)$$

A(a): Intensity of the wavelength band (a) included in the environment light source B(a): Reflectance of the skin corresponding to the wavelength band (a)

C(a): Transmittance of the color filters corresponding to the wavelength band (a)

The gains are preferably determined in advance so that the luminance values Brightness (a) and the luminance values Brightness (b) become equal to each other. The reflectance B(a) and the reflectance B(b) of the skin used here are obtained using a face of Fitzpatrick scale 3 indicating skin including a medium amount of melanin as a reference. The face typically indicates fair-skinned people of Japan. On the other hand, in a case where the present disclosure is employed in an unfixed environment, such as a portable camera, light sources A(a) and A(h) may not be assumed. Therefore, a gain is obtained in a position where imaging is performed. Average luminances in the rectangle regions set in the first embodiment are obtained in both the channels which are determined as average luminances Brightness (a)~ to Brightness (b)~. A gain which realizes a situation in which the values Brightness (a)~ and Brightness (b)~ are equal to each other is preferably set.

After the gains in both the channels are adjusted, a difference image is obtained by subtracting a luminance value of the channel corresponding to the wavelength band (b) from the channel corresponding to the wavelength band (a). Thereafter, a vector indicating a feature value is obtained relative to the difference image by the method described in the first embodiment.

Points of this Embodiment

The configuration of this embodiment has been described hereinabove. Points of this embodiment will now be described in addition to the points of the first embodiment. The configuration of this embodiment is characterized by imaging in a plurality of wavelength bands. Therefore, portions in skin in which melanin is concentrated are more easily detected when compared with the method described in the foregoing embodiment.

In the foregoing embodiment, a face is imaged using a single narrow wavelength band. In the wavelength band, reflectance of skin especially varies depending on presence or absence of melanin, and portions in the skin including melanin are imaged darker whereas portions in the skin which do not include melanin are imaged brighter when compared with the vision of human beings. Specifically, an image may be formed while contrast between the portions including melanin and the other portions is emphasized. On the other hand, in this embodiment, pixels in portions of the skin in which melanin is concentrated may have positive values in the difference image obtained as described above in [Discrimination Process: Feature Extraction].

On the other hand, portions of skin which do not include melanin may have negative values in the difference image. Therefore, the portions of the skin in which melanin is concentrated may be determined using a positive sign or a negative sign. FIG. 6 is a diagram illustrating generation of the difference image according to this embodiment. A reason for obtainment of such a difference image will be described taking a case where a mole in a face is imaged as an example in FIG. 6. In the description above, the image input unit 1100 performs imaging in the wavelength band of 600 nm in which a spectral reflectance barely varies irrespective of presence or absence of a melanin pigment and the wavelength band (b) in which the spectral reflectance considerably varies.

In FIG. 6, a horizontal line in a mole in a face is imaged in the individual wavelength bands so that images (A) and (B) are obtained. The image (A) may be captured in the wavelength band (a) in a state in which a luminance value barely varies irrespective of presence or absence of a melanin pigment. On the other hand, the image (B) may be captured in the wavelength band (b) in a state in which contrast between luminance values is large irrespective of presence or absence of a melanin pigment. A difference image obtained by subtracting the image (B) from the image (A) is illustrated in a lowest portion in FIG. 6. As illustrated in the difference image, pixels in portions of skin which include a large amount of melanin may have positive values in the difference image. Therefore, portions of skin including a large amount of melanin may be indicated by positive and negative values.

Figure 7:
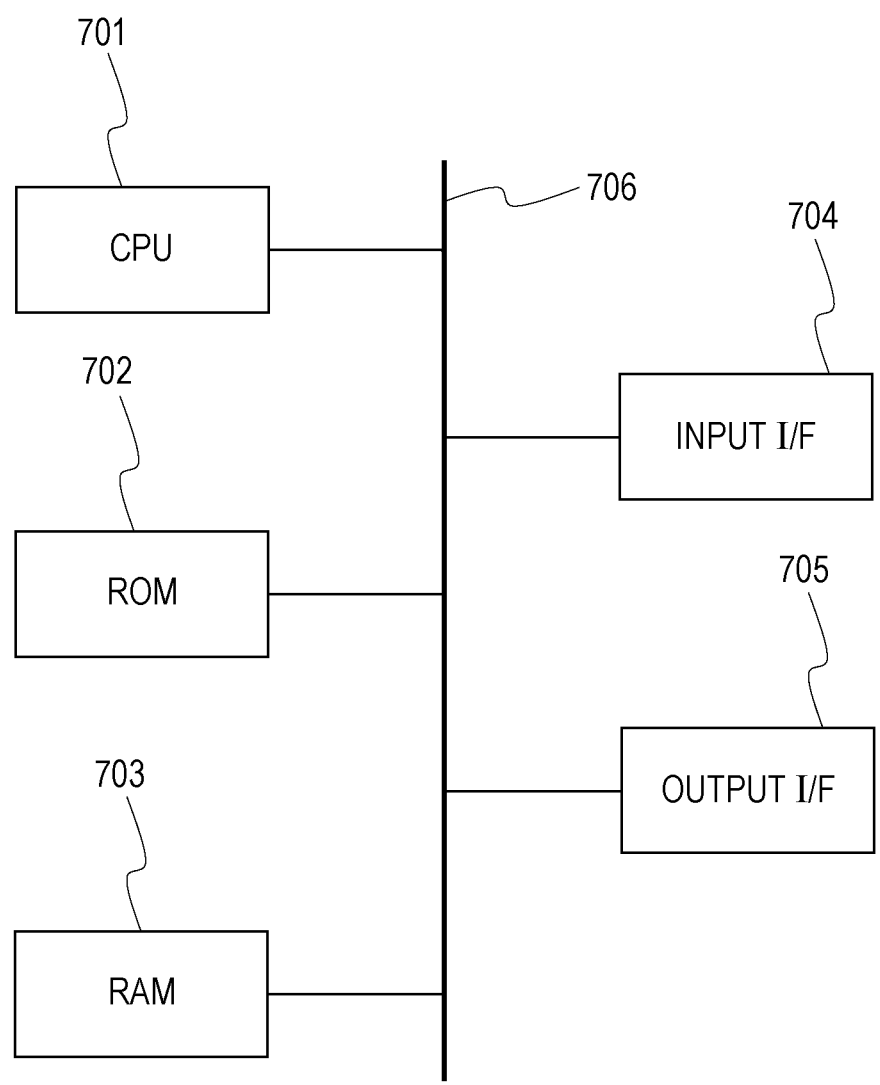
FIG. 7 is a block diagram illustrating a hardware configuration of an image processing apparatus according to the second embodiment.

FIG. 7 is a block diagram illustrating a hardware configuration of an image processing apparatus according to this embodiment. In FIG. 7 CPU 701 integrally controls devices connected to one another through a bus 706. The CPU 701 reads and executes processing steps and programs stored in a read-only memory (ROM) 702. Various processing programs including an operating system (OS), device drivers, and the like according to this embodiment are stored in the ROM 702, and appropriately executed by the CPU 701 after being temporarily stored in a random access memory (RAM) 703. Furthermore, the PAM 703 may be used as a temporary save area for various data. In particular, a static random access memory (SRAM) is suitable for a memory which stores parameters and tables which are referred to in an image deformation process described hereinafter. Furthermore, an input I/F 704 inputs an input signal in a format processable by the image processing apparatus from an external apparatus (such as a display apparatus or an operation apparatus).

Furthermore, an output I/F 705 outputs a signal in a format processable by the external apparatus (such as a display apparatus) to the external apparatus.

Third Embodiment

Although features of an object surface are imaged in an emphasized manner in a specific single narrow wavelength band, the present embodiment is not limited to this. In this embodiment, a case where another wavelength band and another apparatus are used in combination so that features of an inside of an object surface are imaged in an emphasized manner through the object surface will be described. As with the second embodiment, descriptions of portions the same as those of the foregoing embodiments are omitted.

Image Input Unit

As with the first embodiment, by utilizing characteristics in which spectral reflectances of a plurality of types of substance are different from one another in a specific wavelength band, the substances are viewed only in the specific wavelength band. However, differences in the image input unit 1100 from the first embodiment of FIG. 1 will be described in detail.

As an example, a method for imaging skin through cosmetics, such as foundation, which covers a surface of the skin and hides features will be described. According to "Development of Cosmetics for Controlling Skin Appearances", Takanori Igarashi, 2014, some types of foundation are designed such that wavelengths shorter than red are absorbed so that defects of skin are efficiently covered and wavelengths longer than that are permeated so that healthy coloring and a transparent feeling of the skin are produced.

Accordingly, the original surface of the skin may be imaged through the foundation by imaging the surface of the skin in a wavelength band which is longer than red visible light and which is in a narrow range. Typically, any one of wavelengths in the range from a wavelength of 700 nm described in the first embodiment to a wavelength of 880 nm is used.

As another example, a method for imaging blood vessels in the skin in a transparency manner will be described. Specifically, a wavelength of approximately 880 nm which is an absorption band of reduced hemoglobin in blood flowing in veins is used. The wavelength corresponds to near-infrared light having high transmittance of an object, and therefore, veins positioned in a depth direction from the surface by several millimeters may be visualized by a black color. However, in a case where veins are imaged so as to be used as a feature for identifying a person, a portion to be imaged is cared. In general, a face does not include large veins, and therefore, a close-up photo is required to be taken with high resolution such that the skin is substantially in contact with the image input unit 1100. If such a situation is difficult, other portions, such as an arm, a leg, and a neck, are preferably discussed.

A configuration of a supplemental apparatus which enhances the transparency will also be described. The configuration corresponds to a method for imaging light of a light source which enters the inside of the skin and thereafter is reflected. The light source is used in the imaging. As a concrete example, when an extremely narrow range, for example, a point, in the skin surface is irradiated with light, the skin near the range is illuminated from the inside by the light which has entered the skin and which has reflected by the inside of the skin and shadows of hypodermal tissues appear. The shadows are imaged as skin features. By repeatedly performing imaging while a point to be irradiated with light is gradually shifted, hypodermal tissues in a large range may be seen through. As another method, imaging is performed in a state in which polarization filters which are orthogonal to each other are attached to the light source and the imaging apparatus. The light which does not enter the inside of the skin and is reflected by the surface of the skin is removed by the polarization filters so that only light which has entered the inside of the skin once and which has been polarized may be selectively imaged.

Fourth Embodiment

In the third embodiment, the case where features of an inside of an object are emphasized through an object surface in imaging is described. In this embodiment, a case where imaging is performed through a wearing object will be described. As with the second embodiment onwards, descriptions of portions the same as the foregoing embodiments are omitted.
Image Input Unit As with the first embodiment, by utilizing characteristics in which spectral reflectances of a of types of substances are different from one another in a specific wavelength band, the substances are viewed only in the specific wavelength band. However, a method for imaging skin through colored glasses, such as sunglasses, will be described. Specifically, imaging is performed using short wavelength infrared light of approximately 1400 nm. This wavelength is in a wavelength band in which light is not sensed by a general visible light sensor, and therefore, a sensor of an indium/gallium/arsenic (InGaAs) series is preferably used. In this case, a wavelength band having a certain width or a combination of a plurality of wavelength bands is used for imaging. This is because a wide variety of materials may be used for the colored lenses, and therefore, different wavelengths are appropriate for the individual materials, and accordingly, transparency imaging may not be reliably performed.

Figure 8:
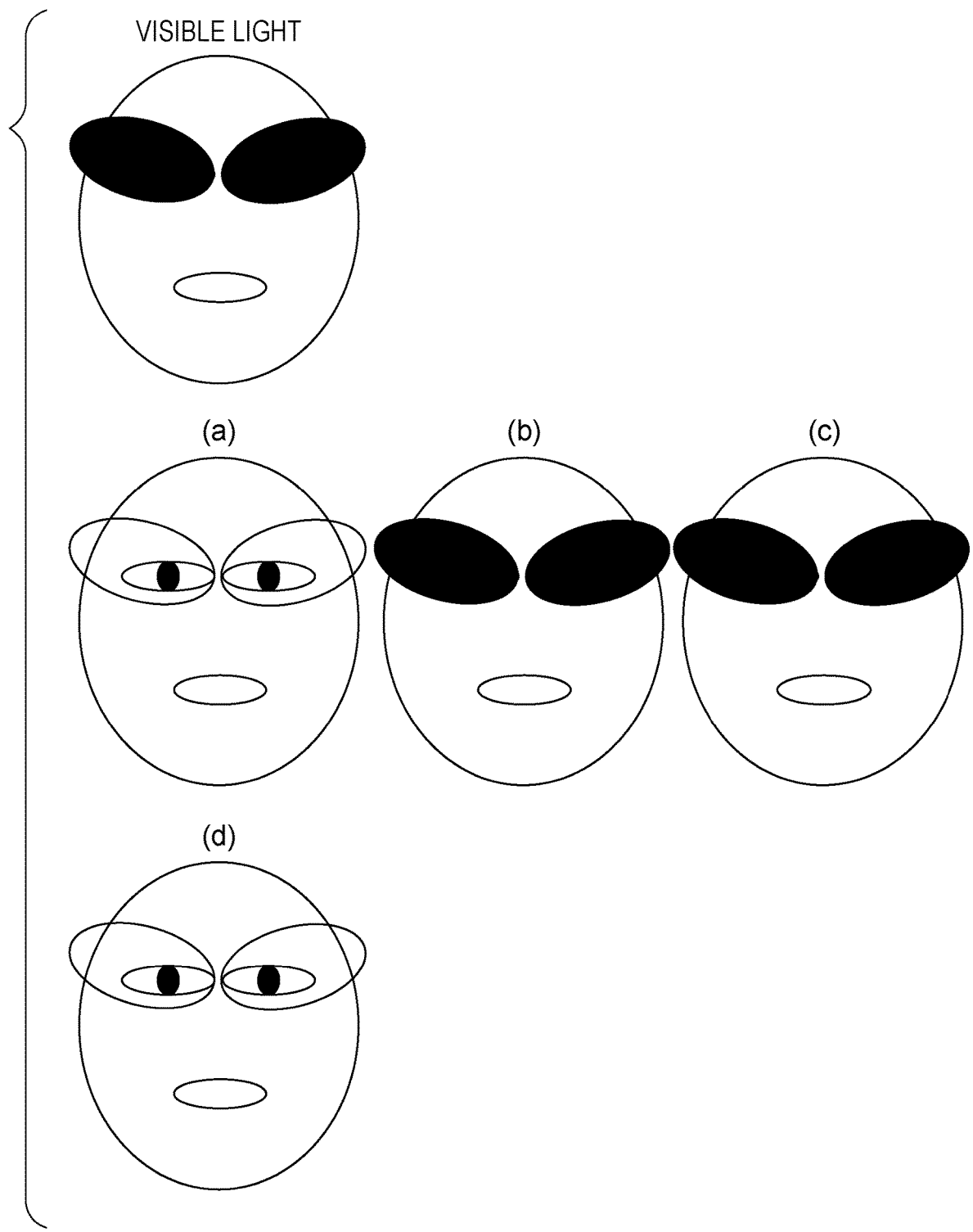
FIG. 8 is a diagram illustrating images captured in different wavelengths.

The following process is performed to perform imaging while a specific wearing object becomes reliably transparent. In FIG. 8, images (a), (b), and (c) are obtained by imaging a face wearing sunglasses in which an accurate spectral absorption index is unknown by short wavelength infrared light beams in different wavelength bands including a center wavelength of approximately 1400 nm. The image (a) is captured in a wavelength in which material of the lenses has a low absorption index, and represents that an opposite side of the lenses is seen through. Although a wavelength band in which the lenses become transparent is not recognized at the time of imaging, a face image is obtained in the state in which the lenses are transparent. An example of the method, the image (d) is obtained by combining images of various wavelength bands maximum value in pixel values in the same position of the captured images (a), (b), and (c) is used to generate a new image. Pixels in the image (a) corresponding to the positions of the lenses are brighter than those in the images (b) and (C), and therefore, the image (a) is automatically employed in the positions of the lenses so that the face image may be obtained while the lenses become transparent. Alternatively, one of the captured images (a), (b), and (c) may be selected. A method for obtaining average luminance of the pixel values in regions corresponding to the lenses and selecting an image having luminance higher than the average luminance may be employed.

Fifth Embodiment

Although the case where a person is identified by an approximately 3 cm square in skin of a face as illustrated in FIGS. 4A and 4B is described, the present disclosure is not limited to this. In this embodiment, a concrete example of discrimination of a person in regions having a different shape, a different size, and a different position will be described. As with the second embodiment, descriptions of portions the same as those of the foregoing embodiments are omitted.
Discrimination Process: Feature Extraction The feature extraction unit 1310 in FIG. 3 will now be described. Although features are extracted from cheeks in the foregoing embodiments, a position, a size, and a shape of a region for the extraction are arbitrarily selected to some extent instead of the cheeks. A pattern of skin to be used for discrimination of a person may be extracted from an exposed region of a several centimeters square, such as a tin or a neck, as denoted by (a) and (b) of FIG. 9. Although a region of 3 cm square is extracted in the first embodiment, a smaller region of 1 cm square may be extracted as denoted by (a) of FIG. 9. Alternatively, a large region, such as an upper half of a face or a lower half of the face denoted by (c) and (d) of FIG. 9, respectively, may be used instead of a portion of skin. As with the first embodiment, positions of the regions (a) to (d) may be relatively obtained from the positional relationship of the face.

Figure 9:
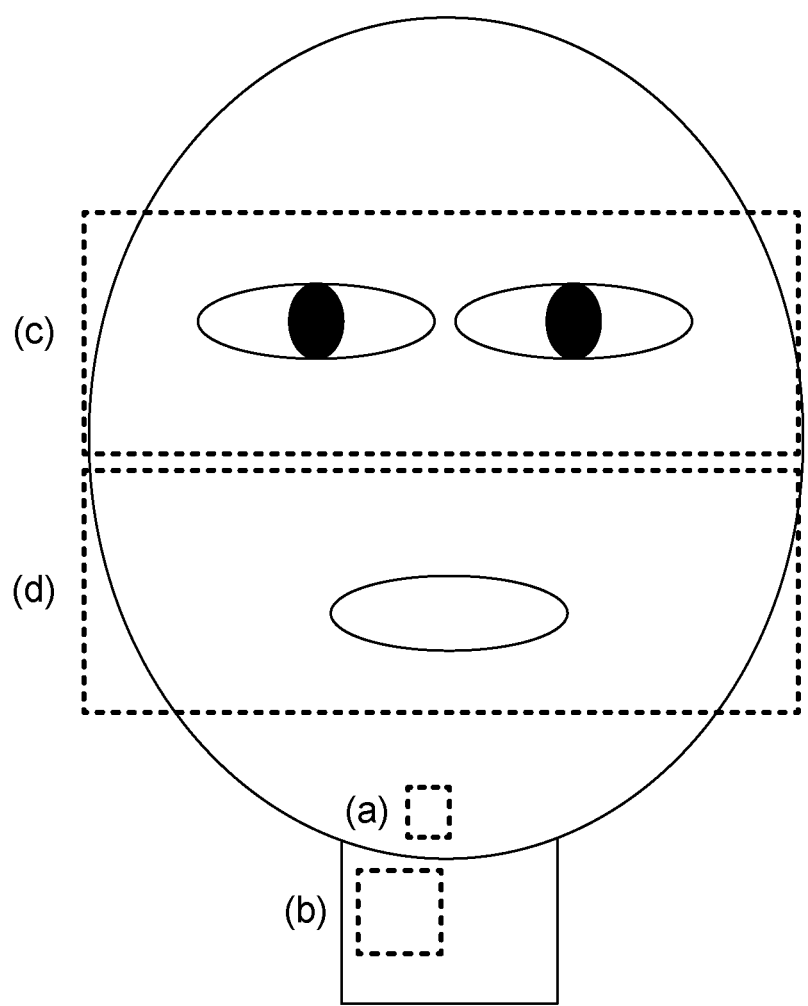
FIG. 9 is a diagram illustrating regions to be used for feature extraction.

In a case where a small region, such as a region (a) of FIG. 9, is used, information sufficient for discrimination of a person is required to be extracted from the small region. Examples of the information include a fine pattern of skin, such as wrinkles and pores, and the pattern is required to be imaged and extracted in higher resolution. Specifically, a distance between eyes in an image is preferably 200 pixels or more. On the other hand, in a case where the region (c) or (d) in FIG. 9 is used, specifically, remarkable features on skin, such as maculae or pigment spots, may be used for discrimination. Resolution in imaging may be comparatively low, and the region may be imaged from a somewhat distant position. Specifically, the distance between the eyes in the image of 100 pixels or more is sufficient. A position, a size, and a shape of the region are appropriately adjusted depending on an installation condition of actual operation.

Sixth Embodiment

Although the example of the simple method for extracting features employed in the feature extraction unit 1310 is described in the first embodiment, a method for more efficiently extracting features of skin will now be described in detail. As with the second embodiment, descriptions of portions the same as those of the foregoing embodiments are omitted.

Discrimination Process: Feature Extraction

The feature extraction unit 1310 in FIG. 3 will now be described. As another method for implementing the feature extraction unit 1310, a convolution neural network (CNN) may be employed in the CNN, a result of a process of performing a convolution operation on an image is connected to a process of performing another convolution operation, and the CNN is a nonlinear image converter which gradually shortens information on the image. In recent years, so-called DeepNet which has layers deeper than that of the CNN achieves high accuracy also in face authentication ("DeepFace: Closing the Gap to Human-Level Performance in Face Verification", Yaniv Taigman, Ming Yang, Mark'Aurelio Ranzato, Lior Volf, 2014). Although the CNN is described in detail in the document, the CNN repeatedly performs the following process in a simple term. As a process in a first layer of the CNN, an input image is denoted by f and an image g of a result of the convolution operation is obtained by Expressions (1) and (2) below. In a second layer of the CNN, the image g of the result of the convolution operation obtained in the first layer serves as the input image f. This operation is repeatedly performed.

$$g = \gamma(f * w) \quad (1)$$

$$g_{x,y} = \sum_{i=0}^{u} \sum_{j=0}^{v} \gamma(f_{x+i,y+j} w_{i,j}) \quad (2)$$

Here, "*" denotes an operator of the convolution operation, and Expression (2) represents details thereof. That is, a convolution kernel w having a vertical width and a horizontal width of u and v, respectively, is applied to a coordinate x and y of the input f. This operation is performed on all coordinates x and y. Furthermore, a function γ ( ) in Expressions (1) and (2) is a nonlinear activating function, and a sigmoid function or an arctan function is used in many cases. In this embodiment, an image is gradually shortened by repeatedly performing the convolution operation, and finally, a value of several hundred orders representing features of a person is extracted. The number of layers in the network and the vertical width and the horizontal width of the kernel w are manually set, and values of the kernels w in the individual layers are obtained in advance by machine learning. An error back propagation method is generally used as a method for obtaining the kernel w. In the error back propagation method, a supervised learning is performed on the neural network. A learnt image and a class to which the learnt image belongs (a correct answer value) are paired, an output value obtained by inputting the learnt image to the CNN is compared with the correct answer value, and a kernel in a final layer is corrected based on a difference between the output value and the correct answer value. The correction of a kernel is repeatedly performed by propagating an attenuated error backward to a layer in a preceding state, and therefore, this name is assigned. The learnt images in this embodiment indicates images of skin regions of a large number of persons collected in advance, and the class of an image indicates a person. Furthermore, it is expected that different characteristics of kernels are learnt in different wavelengths in imaging, and therefore, capturing of a learnt image in a wavelength band used by an image input unit 1100 is recommended. In particular, in a case where one of wavelength bands is selectively used depending on a situation as described above, it is preferable that the CNNs corresponding to the individual wavelength bands are provided.

Other Embodiments

In the foregoing embodiments, a human face is used as an object, and a case where the present disclosure is applied to face authentication for determining a person of the face as a class of face is described as an example. However, as an example of the face recognition other than the face authentication, an age or the like may be estimated as a class of face. For example, the number of pigment spots may be detected as a distribution state of the pigment spots on the skin by the feature extraction method described the foregoing embodiments, and an age corresponding to the number of pigment spots may be output. Furthermore, targets of application of the present disclosure are not limited to images of human faces. Moreover, since the technique described above determines attributes of an object using arrangement of components locally positioned on a surface of the object as a pattern, the technique may discriminate individual vegetables and individual fruits from one another and may be applied to traceability. When the technique is applied to other objects, imaging wavelength bands suitable for the objects are obtained in advance.

Embodiment (s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2016-253866, filed Dec. 27, 2016, which is hereby incorporated by reference herein in its entirety.

What is claimed is:

1. An image processing apparatus comprising:
one or more processors; and
a memory coupled to the one or more processors and having stored thereon instructions which, when executed by the one or more processors, cause the image processing apparatus to perform operations including:
imaging a target object using signals in different predetermined wavelength bands in which a spectral transmittance of a specific type of substance, among a plurality of types of substances, on a surface of the target object is different from spectral transmittances of other types of substances of the plurality of types of substances,
determining locations and sizes of the specific type of substance on the surface of the target object based on a result of calculation using a plurality of images captured by the imaging using the signals in the different wavelength bands, and
discriminating a class to which the target object belongs based on a distribution state of the determined locations and sizes of the specific type of substance on the surface of the target object.

2. The image processing apparatus according to claim 1, wherein the predetermined wavelength bands are included in a long wavelength side of a wavelength band of visible light.

3. The image processing apparatus according to claim 1, wherein the predetermined wavelength bands have a full-width at half-maximum of 100 nanometers or less.

4. The image processing apparatus according to claim 1, wherein imaging includes imaging the target object using signals of a wavelength selected from among a plurality of wavelengths.

5. The image processing apparatus according to claim 4, wherein imaging includes selecting a wavelength to be used for imaging depending on a portion of the target object.

6. The image processing apparatus according to claim 1, wherein the target object is a human face.

7. The image processing apparatus according to claim 6, wherein the surface of the target object indicates a region which is not covered by wearing objects worn on the human face.

8. The image processing apparatus according to claim 7, wherein the wearing objects includes at least one of a hat, sunglasses, a mask, an eyepatch, bandages, and an adhesive plaster.

9. The image processing apparatus according to claim 6, wherein the specific type of substance includes melanin.

10. The image processing apparatus according to claim 6, wherein a class to which the target object belongs includes at least one of a race, a gender, an age, a person, and facial expression.

11. The image processing apparatus according to claim 6, wherein executing the instructions cause the image processing apparatus to perform further operations including:
holding data on faces of persons in advance, and
comparing the locations and sizes of the specific type of substance in the captured image with locations and sizes of a specific type of substance included in the held data on faces to identify a person included in the captured image.

12. A method for an image processing apparatus, the method comprising:
imaging a target object using signals in different predetermined wavelength bands in which a spectral transmittance of a specific type of substance, among a plurality of types of substances, on a surface of the target object is different from spectral transmittances of other types of substances of the plurality of types of substances;
determining locations and sizes of the specific type of substance on the surface of the target object based on a result of calculation using a plurality of images captured by the imaging using the signals in the different wavelength bands; and
discriminating a class to which the target object belongs based on a distribution state of the determined locations and sizes of the specific type of substance on the surface of the target object.

13. A non-transitory computer-readable storage medium storing a program to cause a computer to perform a method for an image processing apparatus, the method comprising:
imaging a target object using signals in different predetermined wavelength bands in which a spectral transmittance of a specific type of substance, among a plurality of types of substances, on a surface of the target object is different from spectral transmittances of other types of substances of the plurality of types of substances;
determining locations and sizes of the specific type of substance on the surface of the target object based on a result of calculation using a plurality of images captured by the imaging using the signals in the different wavelength bands; and
discriminating a class to which the target object belongs based on a distribution state of the determined locations and sizes of the specific type of substance on the surface of the target object.

* * * * *